United States Patent [19]

Tsuji et al.

[11] 4,318,593
[45] Mar. 9, 1982

[54] ZOOM LENS ASSEMBLY WITH TWO MOVABLE FOCUSING LENS GROUPS

[75] Inventors: Sadahiko Tsuji; Noritsugu Hirata, both of Yokohama; Kazuo Tanaka, Tokyo, all of Japan

[73] Assignee: Canon Kabushiki Kaisha, Tokyo, Japan

[21] Appl. No.: 92,843

[22] Filed: Nov. 9, 1979

[30] Foreign Application Priority Data

Nov. 17, 1978 [JP] Japan .................... 53-141851

[51] Int. Cl.³ .................................. G02B 7/10
[52] U.S. Cl. ........................................ 350/430
[58] Field of Search ........................ 350/429, 430

[56] References Cited

U.S. PATENT DOCUMENTS

4,179,191 12/1979 Freudenschuss .................... 350/429

Primary Examiner—John K. Corbin
Assistant Examiner—Rebecca D. Gass
Attorney, Agent, or Firm—Toren, McGeady & Stanger

[57] ABSTRACT

In the disclosed zoom lens assembly containing focusing optics, a variable magnification lens group and an image forming lens group, the focusing optics are divided into a first movable focusing lens group and a second movable focusing lens group, while a control device operatively engaged with a focusing mechanism moves the first and the second movable lens groups a predetermined amount in order to compensate for changes in the picture angle during the focusing operation.

15 Claims, 11 Drawing Figures

ZOOM LENS ASSEMBLY WITH TWO MOVABLE FOCUSING LENS GROUPS

BACKGROUND OF THE INVENTION

1. Field of the Invention

The present invention relates to a motion picture camera, television camera lenses and the like, and particularly, to zoom lenses.

2. Description of the Prior Art

Many zoom lenses are constructed for use with a motion picture camera, a television camera and the like. Generally, such zoom lenses include a focusing lens group, zoom optics composed of a variable magnification lens group and a compensation lens group for compensating the change of the focal point due to the magnification variation and a relay lens group. Conventional zoom lenses compensate for the change of the focal point that occurs when the focal distance is changed. The above compensation lens group fails to compensate for the change in the picture angle that accompanies the movement of the focusing lens group when the focal distance is kept constant. Consequently, when a focusing operating is carried out during continuous photography with a motion picture camera, a television camera and the like, the change in the picture angle along with the change of the focal distance is significant during projection or reproduction. Hence, the size of the image remarkably changes out-of-focus, which gives a strange feeling to the observers. This problem is important in a camera having an automatic focus adjusting device. The reason is that the above-mentioned shortcoming is exaggerated because a quick response for the focusing operation is needed in a camera having an automatic focus adjusting device.

SUMMARY OF THE INVENTION

A purpose of the present invention is to eliminate the above-mentioned problem and to offer a lens construction having a lens mechanism provided with a novel optical control mechanism by means of which the focal distance is kept constant, while none or practically no change in the picture angle occurs even when the focus adjusting operation is carried out.

A second purpose of the present invention is to offer a lens construction for controlling movement of the optics, such that the focusing optics is divided into the first movable focusing lens group and the second movable focusing lens group, while a control device operatively engaged with the focusing operation means moves the first and the second movable focus lens optics group a predetermined amount in order to compensate for the change in the picture angle during the focusing operation.

A third purpose of the present invention is to offer a member for controlling the movement of the lenses, such that the operation means for controlling the movement of the variable magnification lens optics and the focusing operation means are arranged coaxially, while the movement control member which controls the movement of the focusing lens optics by means of the focusing operation means is arranged in the neighborhood of the lens construction in the photographing device.

A fourth purpose of the present invention is to offer a mechanism for controlling the movement of the optics such that the zooming operation is carried out by moving the variable lens optics, the image is compensated for by means of the compensator lens optics and the focusing lens optics is divided into the first and second lens groups so as to carry out the focusing operation and compensation of the change in the picture angle.

A fifth purpose of the present invention is to offer a mechanism for controlling the movement of the first and second focusing lens groups by means of a focusing operation, such that the lens construction includes variable magnification lens optics, afocal lens optics and focusing lens optics. The focusing lens optics is divided into the first and second groups in such a manner that the focusing operation and compensating operation are carried out by means of the focusing lens groups.

DESCRIPTION OF PREFERRED EMBODIMENTS

Figure 1:
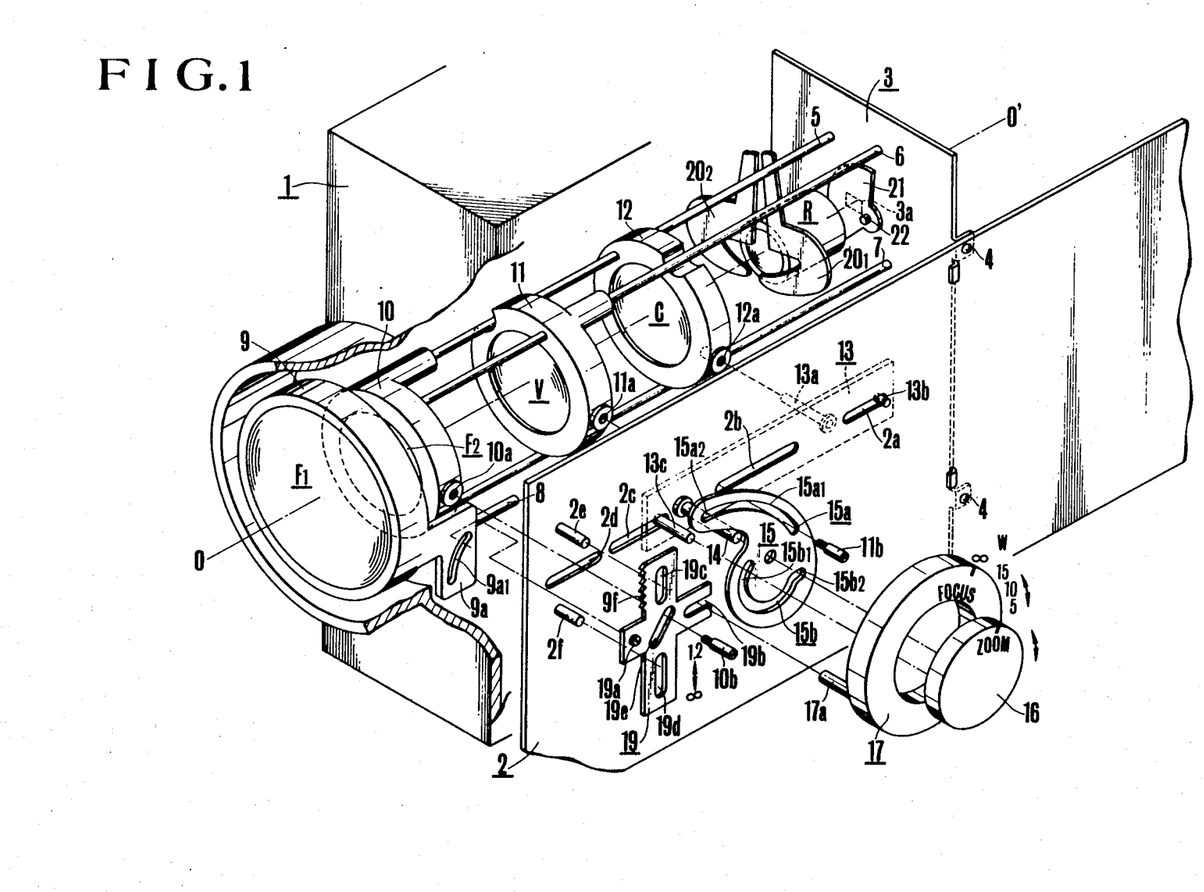
FIG. 1 shows the lens construction of the present invention, whereby the lens construction consists of variable magnification optics, compensator lens optics and first and second focusing lens optics.

FIG. 1 illustrates first focusing lens optics or first focusing lens group $F_1$, second focusing lens optics or second focusing lens group $F_2$, variable magnification lens optics or group V, compensation lens optics or group C, fixed relay lens optics or group R, and a frame 1 of a photographic device such as a motion picture camera, a television camera or other device. A base plate 2 secured on the camera frame 1 contains long holes 2a, 2b, 2c and 2d and frame holes 2e and 2f. The holes 2a, 2b, 2c and 2d are arranged so as to extend almost parallel to the optical axis of the lens groups $F_1$, $F_2$, V, C and R. A plate 3 is fixed on the base plate 2 by means of a screw 4. Guide bars 5, 6 and 7 are fixedly arranged between the plate 3 and a mask plate (not shown in the drawing) and extend parallel to the optical axis 0-0'. A guide bar 8 fixedly arranged between the plate 3 and the mask plate extends parallel to the optical axis 0-0' and projects through the mask plate. A movable ring 9 holds the first focusing lens group $F_1$ and movable rings 10, 11 and 12, respectively support the second focusing lens group $F_2$, the variable magnification lens group V and the compensation lens group C. The movable rings 10, 11 and 12 are slidably guided by means of the guide bars 5, 6 and 7, while the movable ring 9 projects through the mask plate so as to be slidably guided by means of a part of the guide bar 8. Hence, the movable rings 9, 10, 11 and 12 are movable along the optical axis 0-0'.

The movable ring 9 is provided with slide plate 9a slidable over the surface of the base plate 2, and the slide plate part 9a is provided with a cam hole 9a₁. The movable rings 10, 11 and 12 are provided with respective screw holes 10a, 11a, 12a in the portion facing the back of the plate 2, and a pin 10b is screwed in the hole 10a while a pin 11b is screwed in the hole 11a. The pin 10b projects through the long hole 2d in the plate 2, while the pin 11b projects through the long hole 2b in the plate 2. A slide plate 13 is slidably mounted on the back of the plate 2 and a pin 13a is fixed on the slide plate 13, so as to engage the screw hole 12a in the movable ring 12. A pin 13b fixed on the slide plate 13 rides loosely in the long hole 2a in the plate 2, while a pin 13c, also fixed on the plate 13, projects largely through the long hole 2c in the plate 2. The slide plate 13 is provided with an opening (not shown in the drawing) for preventing influence by the pin 11b at a position corresponding to that of the long hole 2b in the plate 2. A rotation shaft 14 rotatably held in the plate 2 projects through the front of the plate 2. A cam plate 15 and a zoom ring 16 fixed on the cam plate 15 rotate in unision with the rotation shaft 14. Further, the cam plate 15 is provided with a first cam hole 15a which the pin 11b enters and a second cam hole 15b through which the pin 13c passes, and the first cam hole 15a is provided with a cam hole portion $15a_1$ for the normal zoom range and a cam hole portion $15a_2$ connected to the portion $15a_1$ for the macro-zoom range. The second cam hole 15b is also provided with the cam hole portion $15b_1$ for the normal zoom range and a cam portion $15b_2$ connected to the cam portion $15b_1$ for the macro-zoom range. A focusing ring 17 rotatably arranged on the circumference of the zoom ring 16 is concentric with the rotation shaft 14, and possesses an internal surface provided with a projecting pin 17a extending toward the plate 2.

A focusing cam plate 19 arranged between the plate 2 and the slide plate 9a of the movable ring 9 controls movement of the first and the second focusing lens groups $F_1$ and $F_2$. The focusing cam plate 19 is provided with a pin 19a loosely engaged in the cam hole 9a of the movable ring 9, an engagement part 19b engages the projecting pin 17a of the focusing ring 17, long holes 19c and 19d which the pins 2e and 2f on the plate 2 engage and a long hole 19e in which the pin 10b freely rides. Further, the focusing cam plate 19 is provided with the adjusting rack portion 19f that serves as a signal input member for operating the focusing cam plate 19 in response to the output signal of a conventional automatic focus adjusting device (not shown in the drawing), if it is applied. Aperture blades $20_1$ and $20_2$ arranged between the compensation lens optics C and the relay lens optics R, are controlled by means of a conventional exposure meter. A shutter blade 21 secured on a shutter shaft 22 to be rotated in operative engagement with a film feeding device, is arranged between the relay lens group R and the plate 3 so as to selectively shade the opening 3a in the plate 3 when the shutter shaft 22 is rotated.

In operation, zooming is first accomplished by rotating the zoom ring 16. FIG. 1 shows the zoom ring 16 in the telephoto position (T). When the zoom ring 16 is rotated clockwise in FIG. 1, in order to carry out zooming from the telephoto position (T) toward the wide angle position (W), the cam plate 15 is rotated clockwise in unison with the zoom ring 16. The clockwise rotation of the cam plate 15 moves the movable ring 11 along the optical axis 0–0' due to the engagement of the pin 11b in the first cam hole 11. The amount of movement along the optical axis is controlled by the first cam hole 15a, while the slide plate 13 is moved due to the engagement of the pin 13c in the second cam hole 15b.

The amount of the movement along the optical axis is controlled by the second cam hole 15b such that in operative engagement with the movement of the slide plate 13, the slide ring 12 is moved along the optical axis 0–0'. Thus, the movable rings 11 and 12, namely the variable magnification lens group V and the compensation lens group C follow the path shown in the range N in FIG. 2a when the pins 11b and 13c are positioned in the normal zoom range cam hole portion $15a_1$ in the first cam hole 15a and the normal zoom range cam hole portion $15b_1$ in the second cam hole 15b. The groups V and C follow the path shown in the range M in FIG. 2a when the pins 11b and 13c are positioned in the macro-zoom range cam hole portion $15a_2$ in the first cam hole 15a and the macro-zoom range cam hole portion $15b_2$ in the second cam hole 15b. Focusing in the macro-zoom range M is carried out by adjusting the rotation of the zoom ring 16 in the macro-zoom range M. Zooming from the wide angle end (W) to the telephoto end (T) is carried out by rotating the zoom ring 16 counterclockwise in FIG. 1.

Figure 2A:
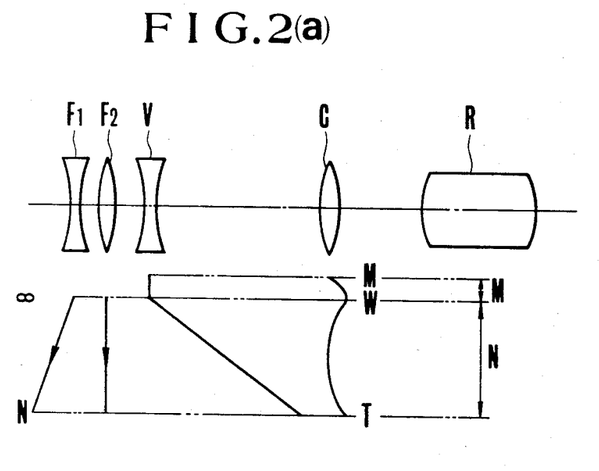
FIGS. 2a to 2f show the axial movement of the optics or lens groups of the lens construction in FIG. 1.

The focusing operation during photography in the normal zoom range is carried out by rotating the focus ring 17. FIG. 1 shows the lens system focused on infinity. In this state, the focusing cam plate 19 has been moved downward in FIG. 1. A very close distance is brought into focus by rotating the focus or focusing ring 17 clockwise from the position in FIG. 1, where the infinite distance is in focus. During rotation of the focus ring in the clockwise direction, the focusing cam plate 19 engaged with the pin 17a of the focus ring 17 is gradually moved upwards in response to the amount of clockwise rotation of the focus ring 17. Upward movement of the focusing cam plate 19 moves the movable rings 9 and 10 independently over the guide bars 8 and 5 in accordance with a predetermined relation due to the engagement of the pin 10b in the cam hole 19e of the focusing cam plate 19 and the pin 19a in the cam hole $9a_1$. Specifically, the first focusing lens group $F_1$ moves very slightly from the original position along the optical axis 0–0', while the second focusing lens group $F_2$ moves as shown in FIG. 2(a).

Below, the moving system of the optics $F_1$, $F_2$, V, C, and R applied to the zoom lens construction shown in FIG. 1, namely, the moving system in accordance to which there is no picture angle change when the focusing is carried out while the focusing lens optics is divided into more than two groups will be explained in accordance with the numerical examples for the thin lens system. In the numerical examples, fi is the focus distance of the respective lens groups. Thus, $f_1$ is the focal distance of the first focusing lens group $F_1$, $f_2$ is that of the second focusing lens optics $F_2$, $f_3$ is that of the variable magnification lens group V, $f_4$ is that of the compensation lens group C and $f_5$ is that of the relay lens group R. Value ei is the distance between the principal points of the respective lens groups, f is the focal distance of the whole system, bf is the back-focus, ek' is the distance between the second principal point and the focal point and S is the distance to the object (here, represented as a negative value for the purpose of convenience).

EXAMPLE 1

| f1 = −33.33333 | e1 = 10. | e1 = 10.4635 | e1 = 10.91 |
|---|---|---|---|
| f2 = 23.63636 | e2 = 20. | e2 = 19.8615 | e2 = 19.735 |

-continued

| | | | | | | | |
|---|---|---|---|---|---|---|---|
| f3 = | −10. | e3 = | 25.45455 | e3 = | 25.45455 | e3 = | 25.45455 |
| f4 = | 40. | e4 = | 10. | e4 = | 10. | e4 = | 10. |
| f5 = | 20.05064 | | | | | | |
| | | f = | 9.114 | f = | 9.096 | f = | 9.060 |
| | | bf = | 20.051 | bf = | 20.023 | bf = | 19.997 |
| | | ek' = | 10.937 | ek' = | 10.937 | ek' = | 10.937 |
| | | S1 = | ∞ | S1 = | −2996.5 | S1 = | −1501.0 |

Figure 2B:
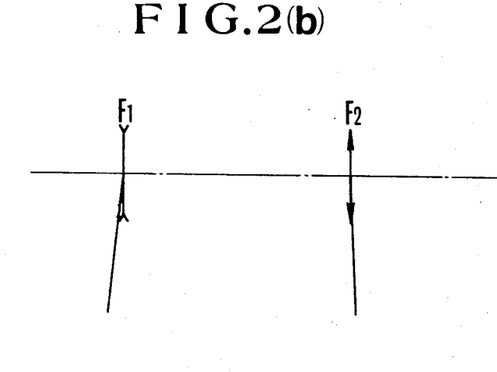

In the above example, the first focusing lens group $F_1$ consists of a negative lens, while the second focusing lens group $F_2$ consists of a positive lens. This example shows that an object 1.5 m distant can be brought into focus without changing the picture angle by moving the first focusing lens group $F_1$ toward the object and the second focusing lens optics $F_2$ toward the image end. The moving traces of the first and second focusing lens groups $F_1$ and $F_2$ are as shown in FIG. 2(b).

EXAMPLE 2

| | | | | | | | |
|---|---|---|---|---|---|---|---|
| f1 = | −100. | e1 = | 10. | e1 = | 11.845 | e1 = | 13.645 |
| f2 = | 31.42857 | e2 = | 12. | e2 = | 12.255 | e2 = | 12.435 |
| f3 = | −10. | e3 = | 25.45455 | e3 = | 25.45455 | e3 = | 25.45455 |
| f4 = | 40. | e4 = | 10. | e4 = | 10. | e4 = | 10. |
| f5 = | 20.05064 | | | | | | |
| | | f = | 9.114 | f = | 9.087 | f = | 9.060 |
| | | bf = | 20.051 | bf = | 20.023 | bf = | 19.997 |
| | | ek' = | 10.937 | ek' = | 10.937 | ek' = | 10.937 |
| | | S1 = | ∞ | S1 = | −2999.3 | S1 = | −1494.4 |

Figure 2C:
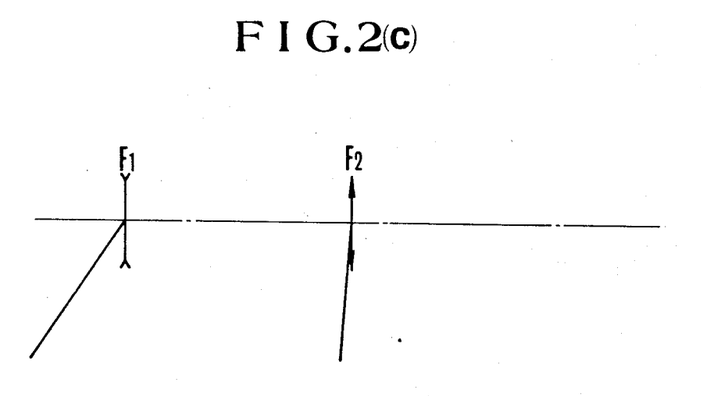

In the above, example, the first focusing lens group $F_1$ consists of a negative lens, while the second focusing lens group $F_2$ consists of a positive lens. This example shows that objects up to about 1.5 m distance can be brought into focus without changing the picture angle by moving the first and the second focusing lens groups $F_1$ and $F_2$ toward the object end, each by a different amount. The moving traces of the first and second focusing lens optics F1 and F2 are as shown in FIG. 2(c).

EXAMPLE 3

| | | | | | | | |
|---|---|---|---|---|---|---|---|
| f1 = | 40. | e1 = | 5 | e1 = | 8.45 | e1 = | 11.784 |
| f2 = | −105. | e2 = | 20.5 | e2 = | 14.2 | e2 = | 8.65 |
| f3 = | −10. | e3 = | 25.45455 | e3 = | 25.45455 | e3 = | 25.45455 |
| f4 = | 40. | e4 = | 10. | e4 = | 10. | e4 = | 10. |
| f5 = | 20.05064 | | | | | | |
| | | f = | 13.671 | f = | 13.611 | f = | 13.554 |
| | | bf = | 20.051 | bf = | 19.991 | bf = | 19.934 |
| | | ek' = | 6.380 | ek' = | 6.380 | ek' = | 6.380 |
| | | S1 = | ∞ | S1 = | −3040.0 | S1 = | −1509.4 |

Figure 2D:
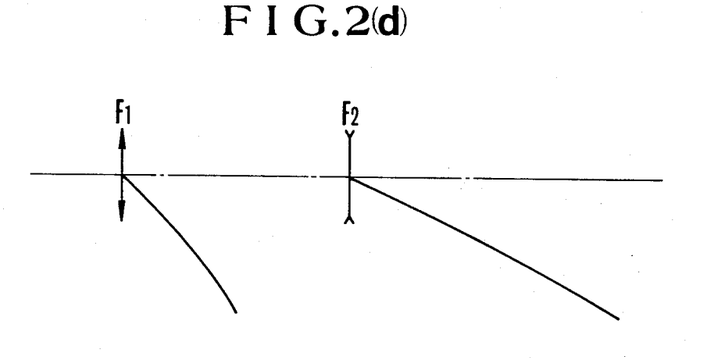

In the above example, the first focusing lens group $F_1$ has a positive power, while the second focusing lens group $F_2$ has a negative power. The moving traces of the first and second focusing lens groups F1 and F2 are as shown in FIG. 2(d).

EXAMPLE 4

| | | | | | | | |
|---|---|---|---|---|---|---|---|
| f1 = | 100. | e1 = | 20. | e1 = | 14.48 | e1 = | 8.885 |
| f2 = | 80. | e2 = | 8. | e2 = | 10.1 | e2 = | 12.09 |
| f3 = | −10. | e3 = | 25.45455 | e3 = | 25.45455 | e3 = | 25.45455 |
| f4 = | 40. | e4 = | 10. | e4 = | 10. | e4 = | 10. |
| f5 = | 20.05064 | | | | | | |
| | | f = | 11.392 | f = | 11.352 | f = | 11.310 |
| | | bf = | 20.051 | bf = | 20.010 | bf = | 19.968 |
| | | ek' = | 8.658 | ek' = | 8.658 | ek' = | 8.658 |
| | | S1 = | ∞ | S1 = | −3089.0 | S1 = | −1506.8 |

Figure 2E:
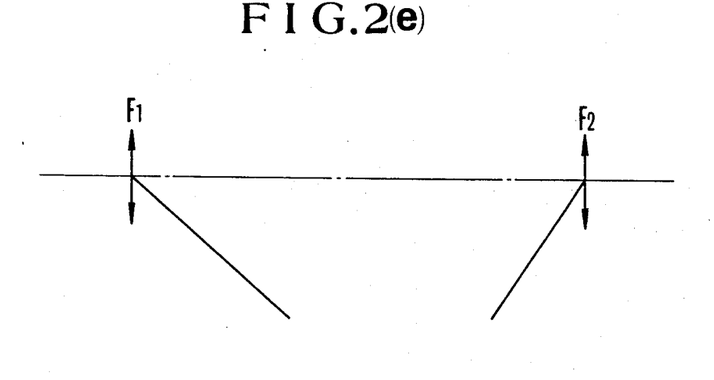

In the above example, the first focusing lens group F1 and the second focusing lens group F2 have a positive power. The moving traces of the first focusing lens optics F1 and the second focusing lens optics F2 are as is shown in FIG. 2(e).

All of the whole focusing lens groups of the above examples 1 to 4 have a positive power, while the same effect can be obtained by means of a so-called negative lead system having a negative power.

In the examples 1 to 4, the focusing lens groups consist of the first and second focusing lens optics F1 and F2. However, according to an embodiment of the invention, the above embodiments are modified so that the third focusing lens group F3 is fixed behind the second focusing lens group F2, or between the first focusing lens group F1 and the second focusing lens group F2. The numerical examples for the third focusing lens optics F3 being fixedly arranged behind the second focusing lens optics F2 are shown in Example 5. Further, numerical examples for the group F3 being fixed between the first and second focusing lens optics F1 and F2 are shown in Example 6.

EXAMPLE 5

| | | | | | | | |
|---|---|---|---|---|---|---|---|
| f1 = | −52. | e1 = | 10. | e1 = | 10.89 | e1 = | 11.836 |
| f2 = | 61.9 | e2 = | 10. | e2 = | 8.26 | e2 = | 8.164 |
| f3 = | 47.73921 | e3 = | 15.67988 | e3 = | 15.67988 | e3 = | 15.67988 |
| f4 = | −10. | e4 = | 25.45455 | e4 = | 25.45455 | e4 = | 25.45455 |
| f5 = | 40. | e5 = | 10. | e5 = | 10. | e5 = | 10. |
| f6 = | 20.05064 | | | | | | |
| | | f = | 9.114 | f = | 9.086 | f = | 9.058 |
| | | bf = | 20.051 | bf = | 20.023 | bf = | 19.995 |
| | | ek' = | +10.937 | ek' = | +10.937 | ek' = | +10.937 |
| | | S1 = | ∞ | S1 = | −2985.7 | S1 = | −1420.9 |

Figure 2F:
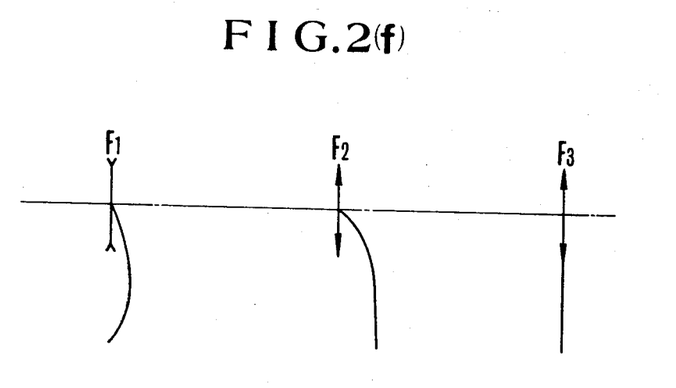

The moving traces of the first and second focusing lens optics F1 and F2 in Example 5 are shown in FIG. 2(f).

EXAMPLE 6

| | | | | | | | |
|---|---|---|---|---|---|---|---|
| f1 = | −100. | e1 = | 10. | e1 = | 11.92 | e1 = | 13.91 |
| f2 = | 110. | e2 = | 10. | e2 = | 9.8 | e2 = | 9.6 |
| f3 = | 44. | e3 = | 12. | e3 = | 12.2 | e3 = | 12.4 |
| f4 = | −10. | e4 = | 25.45455 | e4 = | 25.45455 | e4 = | 25.45455 |
| f5 = | 40. | e5 = | 10. | e5 = | 10. | e5 = | 10. |
| f6 = | 20.05064 | | | | | | |
| | | f = | 9.114 | f = | 9.087 | f = | 9.060 |
| | | bf = | 20.051 | bf = | 20.025 | bf = | 19.997 |
| | | ek' = | +10.937 | ek' = | +10.937 | ek' = | +10.937 |
| | | S1 = | ∞ | S1 = | −3072.7 | S1 = | −1477.9 |

Figure 2G:
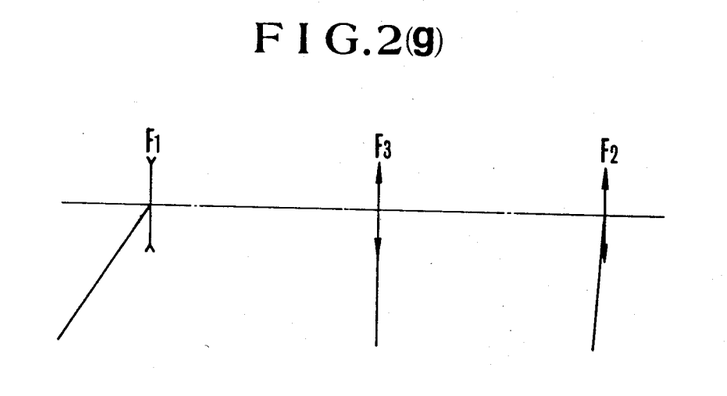

The moving traces of the first and second focusing lens optics $F_1$ and $F_2$ of the above example are shown in FIG. 2(g).

As are clear from Examples 5 and 6, the focusing lens arrangement can be divided into more than two groups, and at least more than two movable groups are moved in such a manner that essentially no change in the picture angle occurs during focusing. By making the distance between the second principal plane and the film plane constant, the angle of the light beam passing through the second principal plane is kept always constant so that the angle of the light beam incident upon the principal plane is constant. In the system in which the pupil is in the neighborhood of the first principal plane, the picture angle can be kept constant by moving the movable groups in this way. Further, in case the position of the pupil is different from that of the first principal plane, it is sufficient to select the amount of the motion in such a manner that the angle of the light beam incident upon the pupil is constant.

Figure 3:
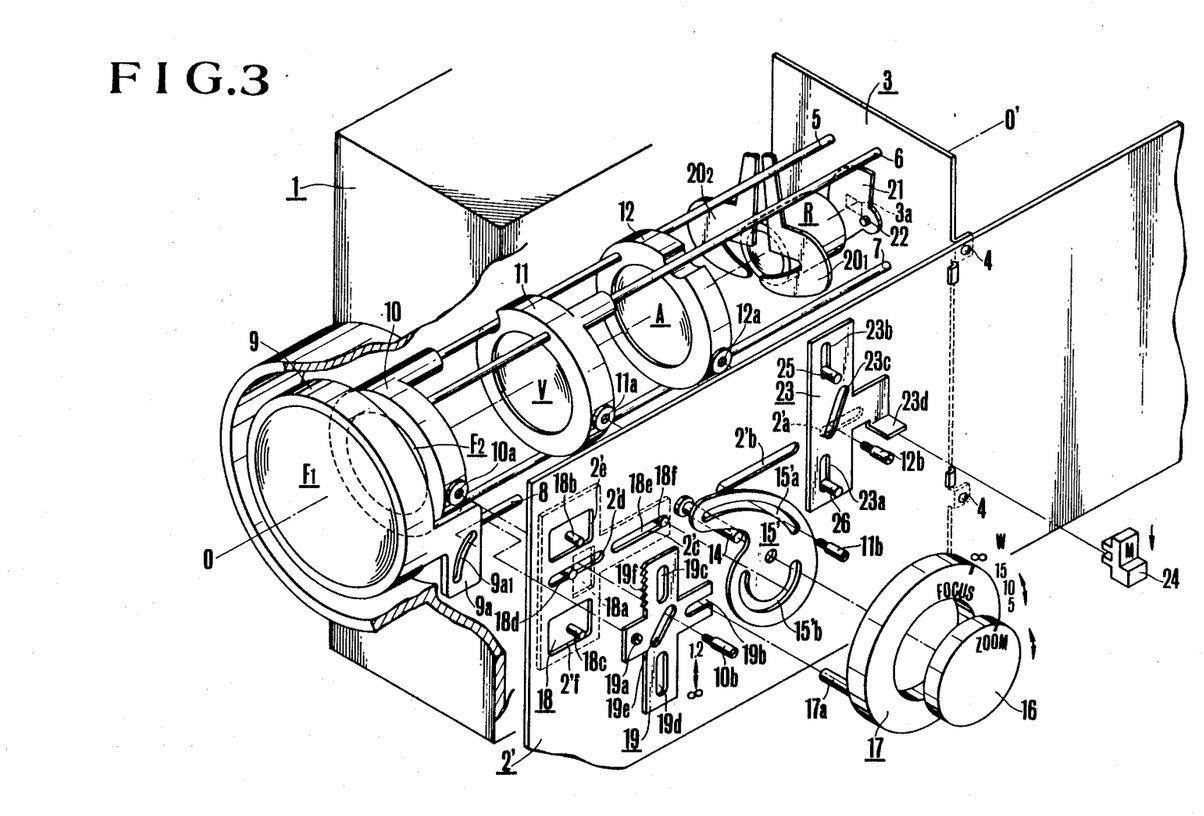
FIG. 3 shows an embodiment of the lens construction in perspective view, whereby the lens construction consists of variable magnification optics, afocal lens optics and first and second focusing lens optics.

FIG. 3 shows a perspective view of another embodiment in which the lens construction as well as the optical control mechanism of the present invention are embodied in the zoom lens.

In FIG. 3, the members having the same reference characters as those in FIG. 1 represent the same members in the zoom lens construction shown in FIG. 1, having the same function. In the present embodiment, the movable ring 12 holds the afocal lens A. The base plate 2' secured on the camera body 1 corresponds to the base plate 2 shown in FIG. 1. The base plate 2' is provided with the long holes 2'a, 2'b, 2'c and 2'd and the frame holes 2'e and 2'f. Further, the long holes 2'a, 2'b, 2'c and 2'd are shaped so as to extend almost parallel to the optical axis 0-0' of the lens groups $F_1$, $F_2$, V, A and R.

A slide plate 18 controls the motion of the first and second focusing lens groups $F_1$ and $F_2$ in cooperation with the focusing cam plate 19 explained with respect to FIG. 1. Arranged in sequence from the optical axis 0-0' to the outside, the slide plate 18, are the base plate 2', the focusing cam plate 19 and the slide plate part 9a of the movable ring 9.

The slide plate 18 is provided with a frame hole 18a to prevent any influence on the pin 10b during the motion of the slide plate 18, a pin 18b passing through the frame hole 2'e of the plate 2' so as to project to the front of the plate 2', a pin 18c passing through the frame hole 2'f of the plate 2' so as to project to the front of the plate 2', a pin 18d freely engaging the long hole 2'd of the plate 2', and a pin 18f passing through the long hole 2'c of the plate 2' so as to project to the front of the plate 2'. A cam plate 15' corresponds to that 15 shown in FIG. 1, and includes a first cam hole 15'a which the pin 11b freely engages and the second cam hole 15'b which the pin 18f freely engages.

A cam plate 23 controls movement of the groups for close-up photography, and is slidably arranged on the surface of the plate 2'.

The cam plate 23 is provided with a bent part 23d connected to a macro-operation knob 24 outside of the camera. Long holes 23a and 23b extend almost perpendicular to the optical axis 0-0', and a long hole 23c is inclined upwards to the right. The long holes 23a and 23b in the cam plate 23 freely engage pins 25 and 26 provided on the plate 2'. The cam plate 23 is slidable upwards and downwards, guided by the long holes 23a and 23b and the pins 25 and 26. Further, a long hole 2'a in the plate 2' is positioned so as to correspond to the long hole 23c in the cam plate 23, and the pin 12b secured in the screw hole 12a in the movable ring 12 freely engages the long holes 2'a and 23c.

When the macro-operation knob 24 is moved downwards (along the direction of the arrow) out of the position shown in FIG. 3, the movable ring 12 is moved along the guide bar 5 to the left in FIG. 3, controlled by means of the pin 12b, the long hole 2'a and the inclined hole 23c. Namely, the afocal lens group A is moved along the optical axis 0-0' to the left in FIG. 3. When, on the other hand, the macro-operation knob 24 is moved upwards out of the down position, the guide bar 5 is moved to the right by means of the movable ring 12. Hence, by operating the macro-operation knob 24, the movable ring 12 is moved along the optical axis 0-0' so as to adjust the position of the afocal lens optics A on the optical axis in order to enable the focusing during macro-zoom photography.

Figure 4:
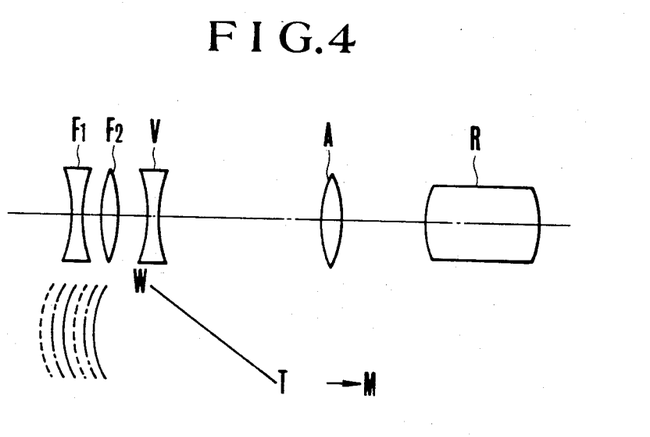
FIG. 4 shows the axial movement of the optics or lens groups of the lens construction in FIG. 3.

The normal zooming operation is carried out by rotating the zoom ring 16. FIG. 3 shows the zoom ring 16 at the end of the wide angle range (W). When the zoom ring 16 is rotated clockwise in FIG. 3, in order to carry out the zooming from the end of the wide angle range (W) to that of the telephoto range (T), a cam plate 15' integral with the zoom ring is also rotated clockwise. When the cam plate 15' is rotated, the movable ring 11, which is controlled by means of a first cam hole 15'a due to the engagement of the pin 11b in the first cam hole 15'a, is moved along the optical axis 0-0'. The slide plate 18 slides in response to the second cam hole 15'b due to the engagement with the second cam hole 15'b. The slide motion of the slide plate 18 causes the focusing cam plate 19 to move in the same direction in unison with the slide plate 18. Hence, operative engagement with the movement of the slide plate 18 and the focusing cam plate 19 moves the movable rings 9, 10 and 11 according to a predetermined relation. Namely, the first focusing lens optics F1, the second focusing lens optics F2 and the variable magnification lens optics V are moved as is shown in FIG. 4 so as to carry out the zooming operation. At the same time, the compensation of the lens optics is accomplished by the movement of the first and second focusing lens optics $F_1$ and $F_2$ during the zooming operation.

The focusing operation is carried out by rotating the focus ring 17. Rotation of the focus ring 17 moves the focusing cam plate 19 upwards or downwards in accordance with the direction of the rotation of the focus ring 17. Selective upward or downward movement of the focusing cam plate 19 shifts the movable ring 10, which is controlled by means of the pin 10b and the cam hole 19e, and shifts the movable ring 9, which is controlled by the pin 19a and the cam hole 9a₁, according to a predetermined relation.

The following is a numerical example of the transport system of the groups F1, F2, V, A and R in the zoom lens shown in FIG. 3, in which no change in the picture angle takes place during the focusing, and the focusing lens group is divided into more than two groups, in accordance with thin lens optics.

EXAMPLE

| | | |
|---|---|---|
| f1 = −33.33333 | e1$_{wide}$ = 10. | e1$_{tele}$ = 10. |
| f2 = 23.63636 | e2$_{wide}$ = 20. | e2$_{tele}$ = 37.45455 |
| f3 = −10. | e3$_{wide}$ = 25.45455 | e3$_{tele}$ = 8. |
| f4 = 40. | e4$_{wide}$ = 10. | e4$_{tele}$ = 10. |
| f5 = 20.05064 | | |
| f$_{wide}$ = 9.114 | f$_{tele}$ = 44.111 | |

Here, it is sufficient that the third group (V) travels linearly between the end of the wide angle range and that of the telephoto range, so that in order to compensate for the change of the position of the focal point, the fourth group (A) is moved once toward the film end and retired or the first and the second group (F1) and (F2) are moved once toward the object and retired. In the above, example, the latter moving system is adopted.

The present embodiment deals with a zoom lens. However, it is possible to apply the system to the front lens focusing system in the fixed focal distance lens when the zoom lens optics group (V, C) in FIG. 1 and the zoom lens optics group (V,A) in FIG. 3 are fixed lens groups. Thus, the present invention is not limited to the above embodiment.

Figure 5:
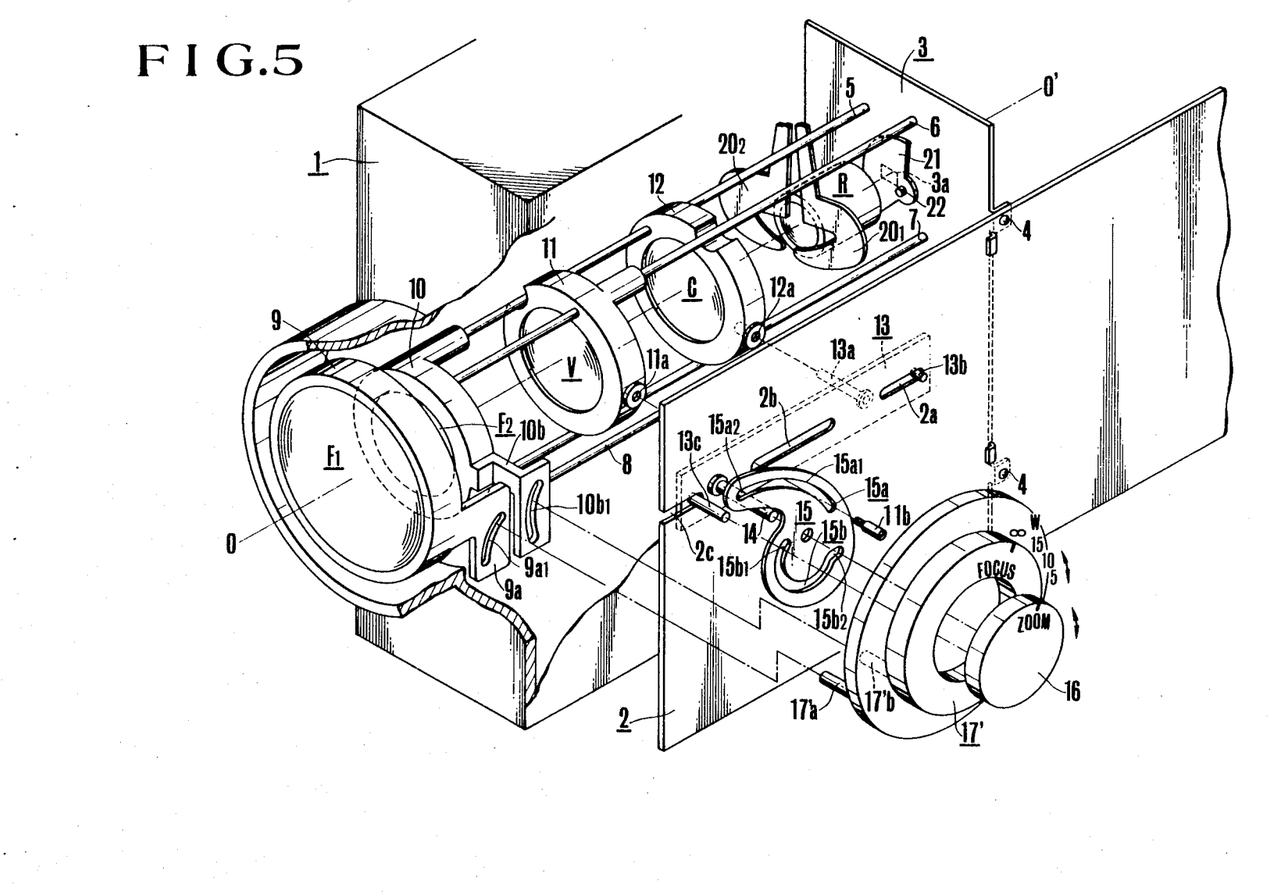
FIG. 5 shows a perspective view of another embodiment of the present invention.

FIG. 5 shows another embodiment of the present invention, in which the movement of the first group of the focusing lens group is controlled independent of the movement controlling means of the second group F2.

In FIG. 5, the same reference characters as in FIGS. 1 to 4 indicate same means and members as in FIGS. 1 to 4. Numeral 17' indicates a focus operating member coaxial to the zoom operating member 16. The lens movement ring 10 of the second group F2 of the focusing lens group is provided with a sliding plate 10b connected thereto, and the sliding plate 16 is provided with a cam groove formed thereon.

The focus operating member 17' carries a first pin 17'a and a second pin 17'b engageable respectively with the cam portion 9a₁ for controlling the movement of the first group f1 and the cam portion 10b₁ for controlling the movement of the second group F2.

This embodiment shows a relatively simplified structure by omitting the sliding plate 18 and the cam plate 19 as shown in the embodiments shown in FIGS. 1 and 3. The operation and function for zooming are similar to those in the foregoing embodiment. Therefore, the description is omitted. Focusing is accomplished in this embodiment, when the focusing ring 17' is rotated, and the first group F1 and the second group F2 of the focusing lens optics are driven along the optical axis in correspondence to the amount of shift of the corresponding cams by the engagement of the pins 17'a and 17'b with the cams 9a₁ and 10b₁. In this embodiment, the optical lens shown in FIGS. 1 and 3 may be used.

As explained, in the lens construction of the present invention, the focusing lens optics consists of the first movable focusing lens group and the second movable focusing lens group, while the control device operatively engaged with the focusing operation means moves the first and second movable lens optics group a predetermined amount so as to compensate for the change in the picture angle during focusing. Hence, the change in the picture angle during the photography, which might otherwise give a strange feeling to the observer that the size of the image changes out of focus, can be effectively avoided.

Further, in accordance with the present invention, as shown in the embodiments shown in FIG. 1 and 3, the control mechanism, which controls the movement of the first and second lens optics F1 and F2 during the focusing operation, can be arranged in the space in the lens construction, whereby the control is accomplished by engagement of the focusing cam plate 19 with the cam part 9a₁ of the movable ring 9 (FIG. 1) or the slide plate 18 and the focusing plate 19 with the cam part 9a₁ of the movable ring 9. Namely, generally a lens with a comparatively large diameter is used as a front lens in the focusing lens optics, so that by effectively making use of the space around the lens, it is possible to achieve a compact photographic device as a whole.

The terms lens group and lens optics have been used interchangeably, and it will be understood that the terms lens group or optics may refer to one or more lenses.

What is claimed is:
1. A device for focus adjustment of a lens assembly capable of zooming comprising:
 (a) a plurality of optical lens groups, a focusing arrangement consisting at least of first and second focusing lens groups, a holding member for said lens groups;

(b) a focusing operation member for moving the first and the second focusing lens groups to perform a focusing operation;

(c) first movement control means for controlling the movement of one of the focusing lens groups a predetermined amount in accordance with the adjusting operation of the focusing operation member; and (d) a second movement control means engaging the first movement control means so as to control the movement of the other focusing lens group a predetermined amount in accordance with the adjusting operation of the focusing operation member, so that focus adjustment is carried out by movement of the first and the second focusing lens groups.

2. A means in accordance with claim 1, wherein the first movement control means includes a cam portion for controlling the amount of movement of the one focusing lens group.

3. A device in accordance with claim 1, wherein the second movement control means includes a cam portion engaged with the first movement control means so as to control the amount of movement of the other focusing lens group by means of the adjusting operation of the focusing operation member through the first movement control means.

4. A device in accordance with claims 2 or 3, wherein the first movement control means is moved along a predetermined direction in accordance with the focus adjusting operation of the focusing operation member, the movement control means including a first cam portion for controlling the movement of the one focusing lens group and the second movement control means including a second cam portion on a part of the holding member of the other focusing lens group, so that the optical lens group is focused by engagement of the first cam portion with the first movement control means.

5. A lens assembly capable of zooming operation consisting of:
(i) a first lens means for varying the magnification;
(ii) a second lens means for compensation of errors accompanying the variation of the magnification;
(iii) a focusing operation member;
(iv) a zooming operation member;
(v) a magnification variation adjusting means for adjusting the variation of the magnification by moving the first lens means with the zooming operation member; and
(vi) adjusting means for carrying out a compensation operation by moving the second lens optics in accordance with the zooming operation of the zooming operation member; comprising:
(a) an optical focusing lens group having first and second focusing lens means;
(b) a first actuating means for controlling the movement of the first focusing lens means of the optical focusing lens group over a predetermined movable range in response to operation of the focusing operation member; and
(c) a second actuating means movable by the operation of the first actuating means, said second actuating means having a cam part for controlling movement of the second focusing lens means of the optical focusing lens group so as to carry out a focus adjustment by moving the first and second focusing lens means.

6. A lens assembly in accordance with claim 5, wherein the focusing operation member is arranged concentrically with the zooming operation member.

7. A lens assembly in accordance with claim 6, wherein the focusing operation member includes engagement means for engaging the focusing operation member with the first actuating means so as to control the movement of the first actuating means by the focusing operation.

8. A lens assembly in accordance with claim 5, wherein the adjusting means further includes an input part of applying a signal to the first actuating means by means of the focusing operation member.

9. A focus adjusting means of the zoom lens assembly consisting of:
(i) a zooming operation member;
(ii) a focusing operation member;
(iii) a first lens optics participating in the zooming operation;
(iv) afocal lens optics;
(v) focusing lens optics; and
(vi) adjusting means for adjusting the magnification by moving the first lens optics in accordance with the operation of the zooming operation member; comprising:
(a) at least two movable groups out of more than two groups into which the focusing lens optics is divided;
(b) a first control means whose movement is controlled by means of the focusing operation of the focusing operation member;
(c) a second control means to be moved with the movement of the first control means so as to control the movement of the movable group of the focusing lens optics; and
(d) a third control means engagable with the second control means so as to control the other movable group of the focusing lens optics.

10. A focus adjusting means in accordance with claim 9, wherein the variable magnification adjusting means is provided with a first cam part for controlling the amount of the movement of the first lens optics and the second cam part for controlling the movement of the first control means.

11. A focus adjusting means in accordance with claim 10, wherein the third control means is constructed as one unit with the lens holder for holding the focusing lens optics in the lens assembly, whereby the lens holder has a cam portion for controlling the movement of the focusing lens optics.

12. A lens assembly comprising:
(a) a zooming operation ring;
(b) a focusing operation ring;
(c) first lens optics for a zooming operation;
(d) second lens optics for a compensating operation;
(e) first control means for controlling movement of the first lens optics along the optical axis in accordance with the operation of the zooming operation ring, said first control means having a disc shaped member to be rotated as a unit with the first control means by means of the rotation operation of the zooming operating ring, the disc shaped member having a first and a second cam portion for controlling the amount of movement of the first and second lens optics;
(f) focusing lens optics having more than two groups, at least two of the groups being movable;

(g) a focusing cam plate for controlling movement of the one movable group of the focusing lens optics by means of the focusing ring, said cam plate having a cam for controlling the amount of movement of the cam plate; and
(h) a slide member whose movement is controlled in accordance with the movement of the focusing cam plate, said slide member having a cam for controlling the amount of movement of the other movable group of the focusing lens optics.

13. A lens assembly comprising:
(a) a zooming operation ring;
(b) a focusing operation ring to be rotated coaxially with the zooming operation ring;
(c) first lens optics for a zooming operation;
(d) afocal lens optics;
(e) focusing lens optics having more than two groups, at least two of the groups being movable;
(f) first control means for controlling the amount of movement of the first lens optics along the optical axis by means of the operation of the zooming operation ring, said first control means having a first cam part for controlling the amount of movement of the first lens optics for varying the magnification, a second cam part for controlling the amount of movement of the focusing lens optics for carrying out compensation of the error accompanying the variation of the magnification, and a slide member engagable with the second cam part so as to indirectly engage the one movable group of the focusing lens optics;
(g) a first focusing cam member engagable with the focusing operation ring so as to control movement of the one movable group of the focusing lens optics by means of the focusing operation; and
(h) a second focusing cam member arranged for engagement with the focusing cam member to control movement of the other movable group of the focusing lens optics for focus adjustment.

14. A lens assembly in accordance with claim 13, further comprising pin-cam engagement means for engaging the first focusing cam member with the second focusing cam member.

15. A lens assembly in accordance with claim 13, wherein the first focusing cam member having an input part for inputting the signal from the automatic focus adjusting device instead of being operated by the focusing operation ring.

* * * * *